Figure 1:
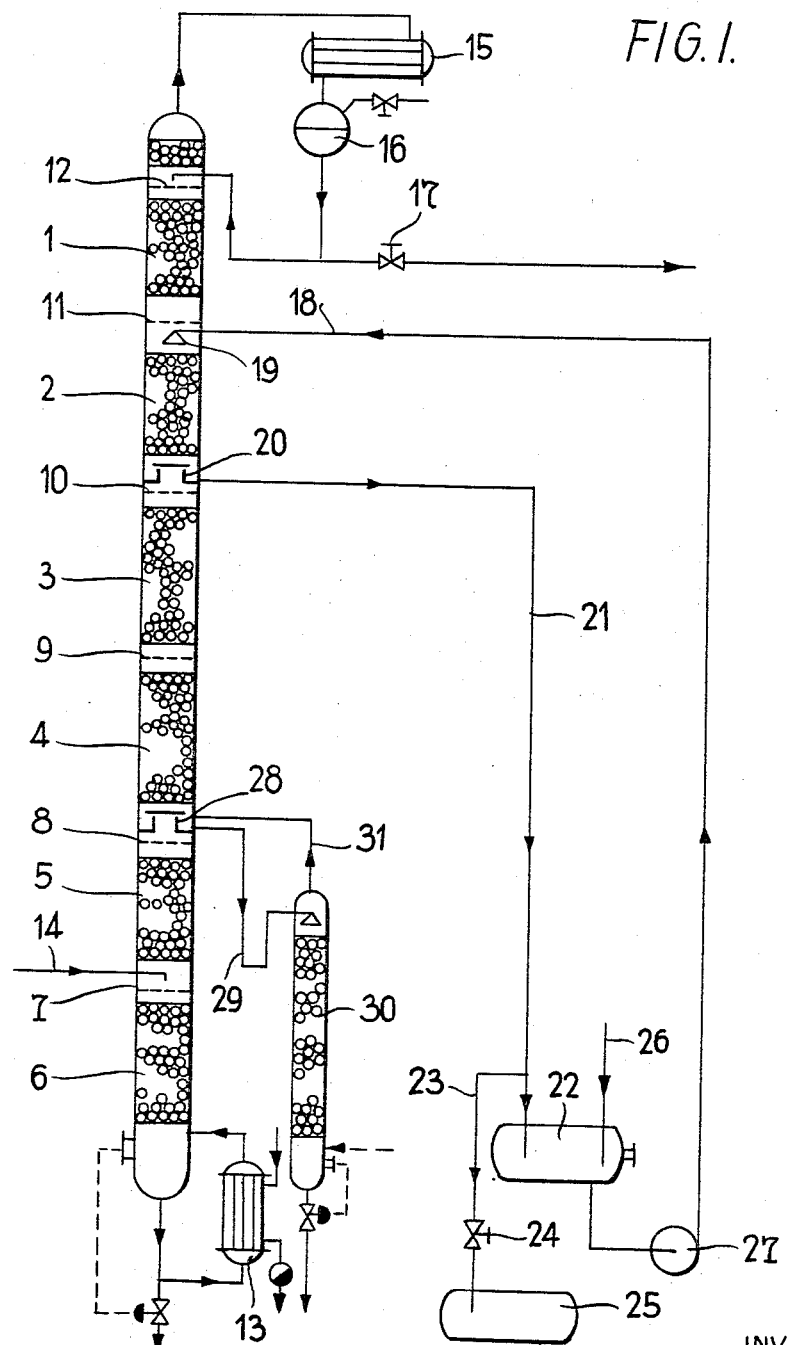

July 11, 1967  G. THEILIG ET AL  3,330,741
DISTILLATION PROCESS FOR PURIFYING ACETONE
Filed March 3, 1964  2 Sheets-Sheet 2

INVENTORS
GERHARD THEILIG
ERHARD WEBER
HEINZ STEINRÖTTER
BY
Curtis, Morris & Safford
ATTORNEYS

United States Patent Office 3,330,741
Patented July 11, 1967

3,330,741
DISTILLATION PROCESS FOR PURIFYING
ACETONE
Gerhard Theilig, Lorsbach, Taunus, Erhard Weber, Frankfurt am Main, and Heinz Steinrötter, Eppstein, Taunus, Germany, assignors to Farbwerke Hoechst Aktiengesellschaft vormals Meister Lucius & Bruning, Frankfurt am Main, Germany, a corporation of Germany
Filed Mar. 3, 1964, Ser. No. 349,111
Claims priority, application Germany, Mar. 12, 1963,
F 39,221
6 Claims. (Cl. 203—37)

It is known that crude acetone, as obtained on an industrial scale according to various processes, can be purified by treating it with alkali solution with subsequent distillation. For the treatment of acetone with alkalies various proposals have been made. The crude acetone can be intimately mixed for a short or long period of time with a lye, the phases separated and the acetone can be purified by distillation. During the mixing process temperatures of 15 to 33° C. are generally maintained. As lye a 20 to 50% soda lye is used.

The treatment with the lye can also be carried out in a wash tower. The lye and the crude acetone are moved in the same direction or the alkali solution is allowed to trickle from above over the filling bodies of the wash tower and the acetone is pumped in at a lower point. It has likewise been proposed to evaporate the acetone in this process and to contact the vapor with the alkali solution on the filling bodies, by the selection of the operating pressure of the wash tower boiling temperatures of the acetone of about 40 to about 90° C. being possible.

It has furthermore been proposed to use carriers impregnated with alkali solution, such as active carbon, graphite and other suitable materials, instead of an aqueous alkali solution. The treatment of the crude acetone can then be achieved, for example, by conducting it over a bed of the alkali-containing material in a tube or in a column. In this case the residence times for an efficient treatment are at least one hour, often they are considerably longer.

It is common to all these processes that the acetone treated with alkali must subsequently be subjected to a distillation. In most cases a fractional distillation, in some cases an extractive distillation using for example water as extracting agent is necessary to obtain a sufficiently pure acetone.

An alkali treatment directly in the distilling column has already been proposed for crude acetone obtained by splitting cumene hydroperoxide. In this case the alkali solution is supplied in a concentration of, for example, 1–25% together with the acetone solution into the centre of the column. The alkali solution is withdrawn from the sump of the column together with the water, while the acetone distills off directly at the head of the column.

The object of the present invention is a process for obtaining pure acetone from an aqueous crude acetone solution by rectification and simultaneous treatment with aqueous solutions of alkali metal and/or alkaline earth metal hydroxides, which comprises conducting the aqueous solution containing alkali metal and/or alkaline earth metal hydroxides in the upper third of a rectifying zone countercurrently with the ascending vapors of the crude acetone. By suitable devices, which are likewise an object of the present invention, the aqueous alkaline solution is introduced into the rectifying zone, of, for example, a rectifying column at an upper place, distributed over the cross-section of the column, collected in a collecting device arranged at a lower position and removed from this device to the outside, the aqueous alkaline solution coming practically not into the sump of the column but remaining preferably exclusively in the upper third of the enrichment section of the column.

The crude acetone to be purified according to the invention can be produced by various industrial processes, for example by the addition of water on propylene in the presence of an acid catalyst and oxidation of the isopropanol thus obtained, by acid splitting of cumene hydroperoxide or by dry distillation of gray lime. The purification process is especially suitable for acetone produced by direct oxidation of propylene, with oxygen or gases containing oxygen in the presence of aqueous catalyst solutions containing a noble metal salt of the platinum group, preferably palladium chloride, as well as halides of a heavy metal occurring in at least two valence stages, especially of copper, iron or chromium. The acetone produced by this latter process has been presenting special difficulties in the purification because it often contains as impurities up to 5% of propionaldehyde and chlorinated acetones, particularly monochloroacetone and 1,1-dichloroacetone. Especially the separation of the chlorinated acetones, which has not yet been described on an industrial scale, is very advantageous according to the present process, particularly when the concentrating by-products are discharged as side stream from the purification zone at a suitable point. A direct saponification of the chlorinated by-products with an alkali solution would be uneconomical because large amounts of alkali would be necessary requiring special apparatus.

The alkali metal or alkaline earth metal hydroxide solutions used in the process of the invention, defined in the following as aqueous alkaline solutions, are solutions of alkali metal and/or alkaline earth metal hydroxides in water. On principle, all alkali metal or alkaline earth metal hydroxides or mixtures thereof may be used, for example sodium hydroxide, potassium hydroxide, calcium hydroxide or barium hydroxide. In order to prepare the said solutions there can also be dissolved the corresponding metal oxides in water in the known manner, for example CaO. The concentration of the solutions depends on the hydroxides used. In the case of $Ca(OH)_2$ and $Ba(OH)_2$ it is preferable to use solutions that are saturated at the operating temperature; with NaOH or KOH solutions having a concentration of 5–45% are suitable. Sodium hydroxide solution of 10 to 45% strength has proved to be especially suitable. Sodium hydroxide offers the advantage that—besides its low price—it forms relatively highly concentrated aqueous solutions which are no longer miscible with acetone.

The rectifying zone in which the crude acetone is purified according to the invention can be arbitrarily arranged and may have any known shape. It is especially advantageous to carry out the process of the invention in a rectifying column operating at normal pressure. In the upper part of the enrichment section of the column prevails the normal boiling temperature of acetone of 56–57° C. The process may likewise be carried out under elevated pressure if the apparatus equipment is provided for, whereby a higher boiling temperature of acetone can be reached.

The rectifying column, wherein a liquid and a vaporous phase of the substances to be separated are countercurrently contacted with one another, is preferably operated in continuous manner while the material to be distilled is supplied at one point in the centre section of the column. The part of the column between the place of inlet and the head is called enrichment section and that between the sump and the place of inlet is called stripping section. The product to be distilled is separated into a head product and a sump product. The distillate passing at the head of the column is condensed and then reconducted to the head of the column to a larger or lesser extent. The sump is heated directely or indirectly.

The process of the invention can be carried out in any rectifying column, that is in plate-type columns such as columns with perforated plates or bubbles plates, as well as in packed columns filled, for example, with Raschig rings, Berl saddles or filling bodies of different shapes.

The aqueous alkaline solution is supplied in the upper third of the enrichment section of the rectifying zone or column, distributed over the cross section of the zone by means of a distribution device, collected in collecting device arranged further down but still in the upper third of the enrichment section of the rectifying zone or column and from there it is discharged. The supply and discharge of the aqueous alkaline solution is suitably carried out in a continuous circuit. However, this is not absolutely necessary. It is sufficient to supply the aqueous alkaline solution at a place in the upper third of the enrichment section of the column and to withdraw it from a lower part of the enrichment section of the column. The mode of operation in a circuit is especially economical in that the alkali solution is better utilized.

When packed columns are used, which are preferred to other columns, it has been found that the acetone obtained is especially pure if the column is operated in the range between the lower and upper limit of load, i.e. if it is more strongly loaded than with a normal distillation. It has been found that it is sufficient to operate only the layer of filling bodies irrigated by the aqueous alkaline solution under a higher loss in pressure (cf. Kirschbaum, Destillier-und Rektifiziertechnik, Springer-Verlag 1960, page 356–358) in order to obtain the same high degree of purity. The best results are obtained when the layer of filling bodies irrigated with the aqueous alkaline solution is operated under a loss in pressure of about 150 mm. water column per meter, thus operated near the upper limit of load. This effect can be reached by appropriately dosing the amount of lye. The total effect can be still improved by using in the said section of the column larger filling bodies than in the other sections. The irrigation with aqueous alkaline solutions can then be increased up to near the upper limit of load.

If plate-type columns are used the plates in the section of the column irrigated with alkali solution can be adapted to the higher amounts of liquids in that with perforated bottoms the bore holes for the passage of the liquid are enlarged or with bubble trays a construction with double pass is used. According to the conformities to law of plate-type columns in this case the limit of load should not be exceeded.

It is preferably to discharge the by-products collecting in the rectifying zone, particularly the chlorinated acetones, together with part of the acetone at a suitable point below the outlet of the aqueous alkaline solution and to separate them in an extra device by distillation. The acetone obtained in this distillation, which is substantially free from by-products, is reconducted into the rectifying column.

The crude acetone can be purified by the process of the invention for example in the apparatus illustrated in FIGURE 1. A rectifying column having a total length of 12.5 meters and a diameter of 400 millimeters is subdivided into layers of filling bodies 1, 2, 3, 4, 5, and 6. Each layer of filling bodies is supported by a grate. Above each layer of filling bodies a distributing bottom 7, 8, 9, 10, 11, and 12 is arranged for distributing the reflux of the column uniformly over the cross section. A heat exchanger 13 serves to heat the sump. The product to be distilled is supplied through inlet 14 ending on the lowest distributing bottom 7. The vapors passing at the head of the column are condensed in condenser 15. The main portion of the distillate flows as reflux from an intermediate vessel 16 to the head of the column. Part of the distillate is discharged as final product via adjusting valve 17.

Directly above the layer of filling bodies 2 is arranged an inlet tube 18 through which the aqueous alkaline solution, for example sodium hydroxide solution, can be introduced into the column. The lye is distributed over the cross-section of the column by means of distributing device 19. Below the layer of filling bodies 2 is situated a collecting bottom 20. An outlet tube 21 permits to remove the alkali solution collected on bottom 20 into storage container 22. A part of the solution can flow off into vessel 25 via conduit 23 controlled by valve 24. The supply of alkali solution in container 22 can be replenished via conduit 26. A dosing pump 27 conveys the alkali solution from container 22 into the column via conduit 18.

The chloroacetones are discharged from collecting bottom 28 below the layer of filling bodies 4 through a conduit 29 ending in the upper part of accessory column 30. The acetone and water vapors stripped in the accessory column are reconducted into the main column via conduit 31, while the chlorinated acetones are withdrawn in admixture with water from the sump of column 30.

The crude acetone fed into the main column is heated in heat exchanger 13. The vapors ascend and are countercurrently contacted in layers of filling bodies 5, 4 and 3 with a substantially alkaline-free reflux. An exchange of substances takes place between the vapors and the reflux owing to the equilibrium conditions prevailing in the rectifying column. The substantially enriched acetone is contacted in the layer of filling bodies 2 with the supplied alkali solution. Thereby the portions of entrained or concomitantly distilled impurities are removed from the acetone. The pure acetone distills off at the head of the column as indicated above.

The alkali solution collects on collecting bottom 20 below the layer of filling bodies 2. The concentration of the alkali solution—especially in the case of NaOH—can be chosen so that it is no longer miscible with acetone. Then two liquid phases form on collecting bottom 20. The lighter layer containing acetone flows over the edge of the collecting bottom into the column while the heavier alkali solution is discharged at the bottom via conduit 21. The discharged amount can be controlled, for example, with an adjusting valve and rotameter.

Figure 2:
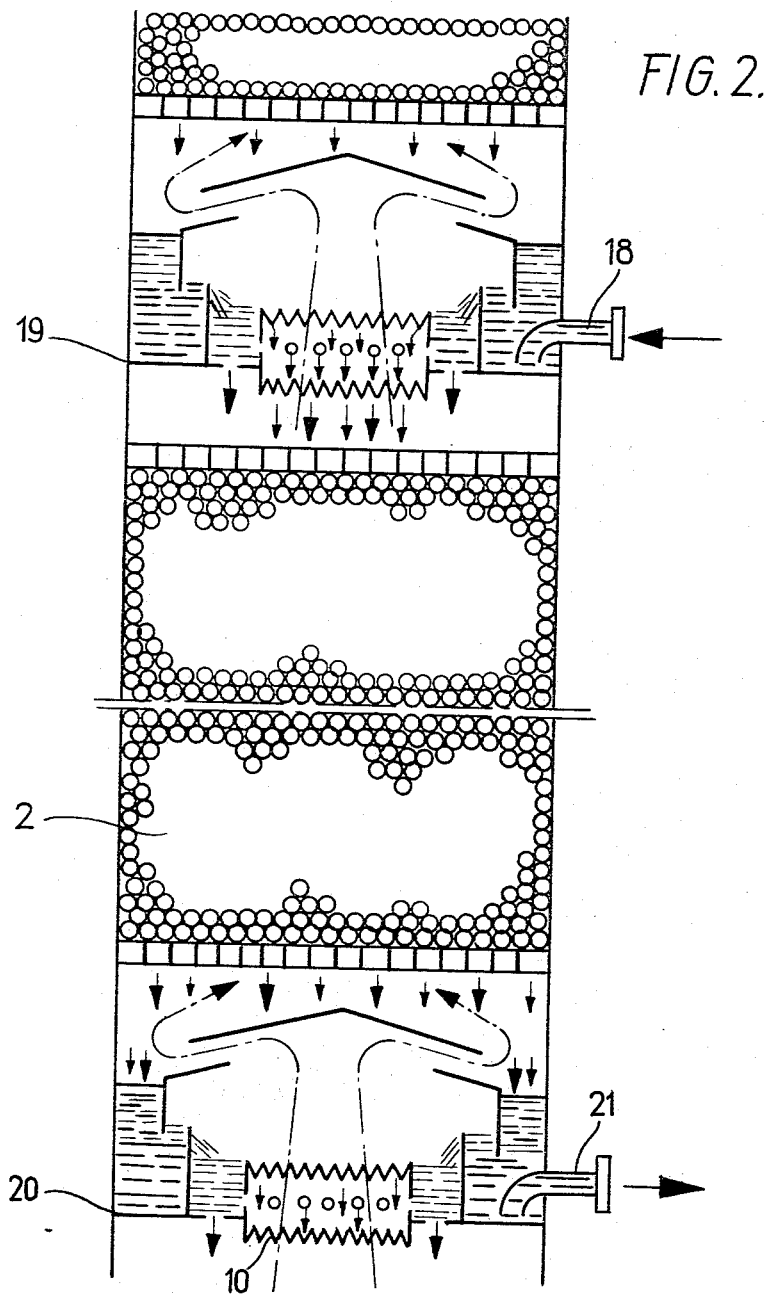

FIGURE 2 represents a detail diagram of FIGURE 1 on an enlarged scale. The numerals correspond to those of FIGURE 1. As an example of one of the possible modes of supplying the alkali solution into the column a distributing bottom 19 is shown to which the aqueous alkaline solution is fed via tube 18.

The collecting bottom 20 collects in a circular part mounted along the wall the alkali solution trickling down in the layer of filling bodies 2 and the acetone reflux. A roof arranged there-above deflects the descending liquids in the direction of the wall of the column. The vapor ascending in the column passes centrally through collecting bottom 20 and travels through the gap between the circular part and the roof further to the top. In the circular part the lighter phase of the acetone separates from the specifically heavier aqueous alkali solution. The acetone flows over the brim of the circular part to the centre and is substantially distributed over the cross section of the column by ring 10. The heavy aqueous phase can be discharged via tube 21.

Another mode of operation with a slightly modified device consists in that above distributing bottom 19 a further collecting and discharging device is installed for the acetone reflux trickling down from the head of the column, which bottom 19 has the same construction as collecting bottom 20. In this case the collected acetone flows downward through a conduit arranged outside along the column. It can be introduced again into the column directly below collecting bottom 20 and distributed over the cross section. The acetone reflux is thus not contacted with the alkali solution, while the ascending acetone vapors are washed in countercurrent by the aqueous alkaline solution. The results obtained by this mode of operation are as good as those described above.

As compared with the known modes of operation the process of the invention offers a large number of advantages. On the one hand in the upper part of the column a fairly enriched acetone that is poor in water is contacted with the basic solution. In this manner a dilution of said solution is largely avoided. Moreover, the supply and discharge of the basic solution can be arranged in such a manner that a circuit is formed, whereby the consumption of alkali metal or alkaline earth metal hydroxide is kept low. In this case the solution can be used until its effectiveness is exhausted. Third, the aqueous alkaline solution does not flow in the column down to the sump. The waste water is not contaminated with alkali metal or alkaline earth metal so that the relatively pure waste water above all poor in inorganic constituents can be used in another process, for example as wash water. In the fourth place, in the process of the invention the formation of resinous by-products in the column is avoided which could take place if the aqueous alkaline solutions would come into contact with the impurities of the crude acetone concentrating in the lower parts of the rectifying zone. Finally, the part of the column irrigated with the solution can be designed in a manner such that an optimum irrigation and an optimum washing and purification effect is achieved. When packed columns are used the layer of filling bodies through which trickles the aqueous alkaline solution is more heavily loaded than the other part of the column. This is desired to a certain extent. It has been found that the effect of purification in the treatment with basic solutions is improved when the load of the column is increased to the upper limit. The upper limit of load should, however, not be exceeded because obstruction phenomena may then occur in the column which can no longer operate smoothly. In this case the supply of basic solution can be further increased when the said section of the column contains larger filling bodies than the other column sections. Thus the limit of load in the said column section is shifted to higher values. By thus adapting the column to the mode of operation according to the invention optimum conditions can be adjusted for the process.

The acetone purified by the process of the invention is superior to commercial acetone that has been purified in known manner.

An especially sensitive control of the quality is the potassium permanganate test wherein 50 ml. of acetone and 2 ml. of a permanganate solution (0.200 g. KMnO₄ in 1000 ml. of water) are kept at 25° C. until the pink colour has disappeared (ASTM Test D1363). Commercial acetone of various sources has a standing time of 1 to 2 hours whereas the acetone purified by the process of the invention has a standing time of far above 3 hours, in most cases of 5 hours and more until the tint fades. Furthermore, by the usual testing methods or gas chromatography neither aldehydes nor chlorine compounds can be detected as impurities.

The invention is illustrated with the aid of the comparative example and Examples 1 and 2. The conditions in the comparative example and Example 1 are identical with the sole exception that in the comparative example the column does not comprise a collecting bottom below the layer of filling bodies 2. Example 2 differs from Example 1 by a higher load in the irrigated section of the column.

A crude acetone was used which had been produced according to the direct oxidation process from propylene with air in the presence of an aqueous solution containing palladium- and copper chloride and which, after the separation of low boiling impurities in a preliminary column had a composition as indicated in the table and determined by gas chromatography:

TABLE

| | Percent by weight |
|---|---|
| Acetone | 5–10 |
| Monochloroacetone | 0.1–0.3 |
| 1,1-dichloroacetone | 0.02–0.1 |
| Acetic acid | 0.02 |
| Methyl acetate | 0.01 |
| Propionaldehyde | Traces |
| Propionic acid | Traces |
| Acetaldehyde | Undetectable |
| Water | Remainder |

EXAMPLES

*Comparative example*

600 l./h. of a crude acetone having the composition indicated in the table were fed into the column according to FIGURE 1, which did not contain a collecting bottom below the layer of filling bodies 2. 2 litres of sodium hydroxide solution of 20% strength were added per hour via lye conduit 18. After having reached stationary state 15 parts of the distillate were reconducted as reflux to the head of the column and a part withdrawn as final product. The concentrating chloroacetones were withdrawn from collecting bottom 28 via conduit 29 and fed into accessory column 30. In the main column a difference pressure of 60–70 mm. of water column adjusted per meter of layer of filling bodies.

The crude acetone obtained had the following properties:

| | |
|---|---|
| Permanganate standing time according to ASTM D1363 | 90 minutes. |
| Water content (titration with Karl-Fischer reagent) | 0.30%. |
| Density $d_{20/4}$ | 0.791. |
| Reaction towards litmus | Neutral. |
| Evaporation residue | Unweighable. |

In the effluent from the sump of the column alkali metal and chlorine ions could be detected. The chloroacetones discharged at the bottom of accessory column 30 were partially resinified and dirty brown owing to the action of the sodium hydroxide solution.

*Example 1*

A collecting bottom was installed below the layer of filling bodies 2 of the column used in the comparative example. The column was then set in operation under the same conditions as in the comparative example. With a supply of 2 l./h. of sodium hydroxide solution of 20% strength via conduit 18 1.90–1.95 l. of the collected lye were discharged per hour from collecting bottom 20. Noticeable amounts of acetone were not contained in the discharged lye. In the first 24 hours of operation the lye was reconducted into container 22. Later on 0.5 l./h. of the lye flowing off was withdrawn via conduit 23: the same amount of fresh lye (20%) was filled into the container 22 via conduit 26. The lye of container 22 was conveyed again to the head of the column by means of pump 27. Under these conditions the column remained in operation for several weeks.

The pure acetone obtained had the properties:

| | |
|---|---|
| Permanganate standing time according to ASTM D1363 | 100 minutes. |
| Water content (titration with Karl-Fischer reagent) | 0.28%. |
| Density $d_{20/4}$ | 0.791. |
| Reaction towards litmus | Neutral. |
| Evaporation residue | Unweighable. |

In the discharge from the sump of the column only traces of inorganic ions could be detected. The chloroacetones discharged from the accessory column at the bottom were slightly yellow and scarcely resinified.

Example 2

In the column used in Example 1 the supply of sodium hydroxide solution per hour via conduit 18 was increased under otherwise identical conditions until a measuring device for the difference pressure, connected with one leg above, with the other one below the layer of filling bodies 2, indicated a loss in pressure of about 250–270 mm. of water column. With a height of the layer of filling bodies 2 of 1.75 m. this loss in pressure corresponded to a value of about 143–154 mm. of water column per meter of layer of filling bodies. The amount of sodium hydroxide solution removed from the cycle and freshly supplied was maintained at 0.5 l./h. The column remained in operation under these conditions for several weeks.

The acetone obtained had the following properties:

| | |
|---|---|
| Permanganate standing time according to ASTM D1363 | Over 3 hours. |
| Water content (titration with Karl-Fischer reagent) | 0.25%. |
| Density $d_{20/4}$ | 0.790. |
| Reaction towards litmus | Neutral. |
| Evaporation residue | Unweighable. |

The chloroacetones discharged from the accessory column 30 had a yellowish color, however, the coloration was only a little more intense than that of the product of Example 1. The waste water from the sump of the main column only contained very small amounts of inorganic ions.

We claim:

1. In a rectification process for obtaining a pure acetone from crude acetone containing a chlorinated acetone which crude acetone is obtained by direct oxidation of propylene with oxygen-containing gases in the presence of an aqueous catalyst containing a noble metal salt of the platinum group and heavy metal halides which heavy metal occurs in at least a lower and a higher valence stage and is selected from at least one metal selected from the group consisting of copper, iron, and chromium, the improvement comprising the steps of: introducing into an enrichment zone of a rectification zone counter-currently to an ascending vapor stream of acetone an aqueous alkaline solution of at least one hydroxide of a metal selected from the group consisting of alkali metals and alkaline earth metals; collecting the counter-currently down-coming alkaline solution within the upper third of the rectification zone in a liquid collection zone; removing said alkaline solution from the rectification zone; reintroducing the alkaline solution into the enrichment zone above the collection zone; introducing into a stripping zone of the rectification zone crude acetone; stripping from the crude acetone the chlorinated acetone together with the acetone; collecting the stripped chlorinated acetone together with part of the acetone and some water in the liquid state at a point which is situated above the point of introduction of crude acetone and removing it from the stripping zone of the rectification zone; introducing the chlorinated acetone and said part of acetone and water into an accessory rectification zone; reintroducing into the rectification zone the acetone collected from the accessory rectification zone, said chlorinated acetone being removed from said acetone before the acetone is being contacted with the aqueous alkaline solution; removing the waste water from the sump of the rectification zone; and recovering at the head of the rectification zone the purified acetone.

2. The process of claim 1 wherein the accessory rectification zone is operated as a distilling column from which the chlorinated acetones and the water are removed as a sump product and acetone as a head product.

3. The process according to claim 1 wherein an additional collecting zone is placed in the enrichment zone, which additional collecting zone collects acetone reflux trickling down from the head of the rectification zone; conducting the collected acetone outside the rectification zone and reintroducing the acetone in the rectification zone below the alkaline solution collecting zone.

4. The process of claim 1, wherein the aqueous alkaline solution is countercurrently conducted with the ascending vapors of the crude acetone in the upper third of the enrichment sections of the rectifying column in a manner such that it does not come into the sump of the column.

5. The process of claim 1, wherein the aqueous alkaline solution is an aqueous sodium hydroxide solution of 10 to 45% strength.

6. The process of claim 1, wherein such an amount of aqueous alkaline solution is introduced into the enriching zone that the section of the column between the point of introduction of the alkali solution and the alkali solution collection zone operates just below the upper limit of loading.

References Cited

UNITED STATES PATENTS

| | | | |
|---|---|---|---|
| 2,271,671 | 2/1942 | Wible | 261—94 |
| 2,377,781 | 6/1945 | Hebbard | 261—94 |
| 2,575,244 | 11/1951 | Carlson et al. | 203—37 |
| 2,614,072 | 10/1952 | Carlson et al. | 203—37 |
| 2,624,699 | 1/1953 | Joris | 203—37 |
| 2,662,848 | 12/1953 | Emerson et al. | 203—37 |
| 2,906,675 | 9/1957 | Hall et al. | 203—53 |
| 3,122,594 | 2/1964 | Kielback | 261—94 |

NORMAN YUDKOFF, *Primary Examiner.*

WILBUR L. BASCOMB, JR., *Assistant Examiner.*